United States Patent [19]
Satoh et al.

[11] Patent Number: 5,313,612
[45] Date of Patent: May 17, 1994

[54] INFORMATION RECORDING AND REPRODUCING APPARATUS INCLUDING BOTH DATA AND WORK OPTICAL DISK DRIVES FOR RESTORING DATA AND COMMANDS AFTER A MALFUNCTION

[75] Inventors: Isao Satoh; Yoshihisa Fukushima, both of Osaka, Japan

[73] Assignee: Matsushita Electric Industrial Co., Ltd., Osaka, Japan

[21] Appl. No.: 22,418

[22] Filed: Feb. 16, 1993

Related U.S. Application Data

[63] Continuation of Ser. No. 401,293, Aug. 31, 1989, abandoned.

[30] Foreign Application Priority Data

Sep. 2, 1988 [JP] Japan .................. 63-220945

[51] Int. Cl.$^5$ .................. G06F 12/16; G06F 11/20
[52] U.S. Cl. .................. 395/425; 395/575; 364/DIG. 1; 365/228; 371/8.1; 371/10.1
[58] Field of Search .............. 395/425, 575, 200 MS, 395/900 MS; 365/228, 229; 371/8.1, 10.1, 10.2

[56] References Cited

U.S. PATENT DOCUMENTS

| | | | |
|---|---|---|---|
| 4,077,059 | 2/1978 | Cordi et al. ............ | 395/600 |
| 4,837,680 | 6/1989 | Crockett et al. ......... | 395/325 |
| 4,862,411 | 8/1989 | Dishon et al. .......... | 395/425 |
| 4,870,565 | 9/1989 | Yamamoto et al. ........ | 395/425 |
| 4,916,605 | 4/1990 | Beardsley et al. ....... | 395/425 |
| 5,051,887 | 9/1991 | Berger et al. .......... | 395/425 |

FOREIGN PATENT DOCUMENTS 0156179 10/1985 European Pat. Off. .
0273665 7/1988 European Pat. Off. .

OTHER PUBLICATIONS

Nikkei Electronics Mar. 11, 1985, pp. 159-187.

*Primary Examiner*—Glenn Gossage
*Attorney, Agent, or Firm*—Lowe, Price, LeBlanc & Becker

[57] ABSTRACT

An information recording and reproducing apparatus has a plurality of optical disk drives including a data optical disk drive for storing data, a work or backup optical disk drive for temporarily storing the data and, preferably, a disk cache memory. The optical disk drives are coupled to a host device such as a central processing unit (CPU) through an optical disk control unit for controlling recording and reproduction of the data. The optical disk control unit writes commands and data transmitted from the host device into the work optical disk drive and the disk cache memory and, if required, writes the data of the disk cache memory into the data optical disk drive. The optical disk control unit, on activation of the apparatus following a malfunction, restores the data of the data optical disk drive to the most recent state thereof by using the contents of the work optical disk drive, whereby the number of times of writing to an optical disk is decreased by using the disk cache memory so as to prevent the data loss on occurrence of problems in functioning of the apparatus, such as power failure or hardware error.

12 Claims, 3 Drawing Sheets

WRITE-THROUGH: ⓔ, ⓕ
WRITE-BACK: ⓖ, ⓗ

INFORMATION RECORDING AND REPRODUCING APPARATUS INCLUDING BOTH DATA AND WORK OPTICAL DISK DRIVES FOR RESTORING DATA AND COMMANDS AFTER A MALFUNCTION

This application is a continuation of application Ser. No. 07/401,293 filed Aug. 31, 1989, now abandoned.

BACKGROUND OF THE INVENTION

The present invention relates to an information recording and reproducing apparatus which comprises a combination of a plurality of disk drives for recording and reproducing data on and from disc-like recording media, and more particularly to such an apparatus which effects the recording and reproduction of data by using optical disks.

A conventional information recording and reproducing apparatus using a magnetic disk drive is disclosed in "NIKKEI ELECTRONICS 1985.3.11" (Mar. 11, 1985), pp. 159–187, as illustrated in FIG. 1 showing an arrangement of the conventional information recording and reproducing apparatus. In FIG. 1, illustrated at numeral 1 is a central processing unit (CPU) of a host computer which acts as a host device for recording and reproduction of data in and from a magnetic disk drive 12. Also included in the conventional information recording and reproducing apparatus are a main memory 2 which stores data and programs for the CPU 1 and a channel 3 for the CPU 1 which is for control of the input and output of data. Numeral 10 represents a disk control unit for controlling the magnetic disk drive 12 and a disk cache memory 11 to allow increased speed of data recording and reproduction processes. The disk cache memory 11 is a memory for increasing the speed of data access between the magnetic disk drive 12 and the CPU 1.

Operation of the conventional recording and reproducing apparatus with the above-mentioned arrangement will be described hereinbelow with reference to a data read and write flow chart illustrated in FIG. 2.

In a data-read operation, when access is first made with respect to one specific file, the disk control unit 10 simultaneously prefetches the next block of the file if it is absent in the cache memory 11. In this state, in response to a data-read request (a) from the CPU 1 with respect to one file, the disk control unit 10 refers to a directory DIR of the disk cache memory 11, which is placed in the disk control unit 10, to check whether or not the target data block of the pertinent file is present in the disk cache memory 11. In the case of the presence (i.e., hit) of the data block in the disk cache memory 11, the data block is transmitted from the disk cache memory 11 through the channel 3 to the main memory 2. In the case of the absence (miss) of the data block therein, several blocks (made up of sectors) including the target block are read out to the disk cache memory 11 and, of these blocks, the target block is transmitted to the main memory 2. Thus, if the disk cache memory 11 has an excellent hit probability, the data are directly transmitted from the disk cache memory 11 thereby sharply improving the data access speed.

In a data-write operation, well-known write-through system and write-back system are used which depend on the rewriting order between the disk cache memory 11 and the magnetic disk drive 12.

According to the write-through system, data are first written in the magnetic disk drive 12 ((e)). If the block corresponding to the recorded data is present in the disk cache memory 11, that is, in the case of hit, the corresponding block in the disk cache memory 11 is invalidated or the same data are also written in the disk cache memory 11 ((f)).

On the other hand, in the write-back system, data are preferentially written into the disk cache memory 11 ((g)), and when an unoccupied area for writing the data is absent in the disk cache memory 11 or when the block is not required or when the system determines that the data which have not been copied should be transmitted to the magnetic disk drive 12, data in the disk cache memory 11 are transmitted to the magnetic disk drive 12 where the data are recorded ((h)).

However, the above-described systems have both merits and demerits. In the write-through system, although data are not lost in response to a loss of power, a limitation is imposed on the write cyclability (the number of times of recording repetition) in the case of using a rewritable optical disk instead of the magnetic disk drive 12. That is, the number of times of writing data in response to requests of the host device directly affects the number of times of rewriting data in the optical disk. In an optical disk using a magneto-optical recording medium or a phase change recording medium which is arranged for effecting writing and erasure of a signal by the heating action due to a laser light beam, there is a problem in that the number of times of recording and erasure of data is limited due to the thermal stress of the medium caused by the light beam. For example, it is known that the write cyclability of a magneto-optical disk is about 1,000,000 to 10,000,000 and the write cyclability of the phase change recording medium for effecting the phase change in the amorphization state and crystallization state by using heat due to the laser light beam is about 1,000,000.

On the other hand, in the write-back system, in response to power-off prior to writing the data from the disk cache memory 11 into the magnetic disk drive 12, the data are lost from the disk cache memory 11, and therefore there is a problem that the disk cache memory 11 requires a battery back-up system. In addition, it is required to return the contents of the disk cache memory 11 to the magnetic disk drive 12 before cutting-off of the power source.

SUMMARY OF THE INVENTION

It is therefore an object of the present invention to provide an information recording and reproducing apparatus which is capable of raising the limit for the number of times of rewriting of an optical disk and which is further capable of restoring data in response to power failure, power-off or hardware error in an optical disk drive.

A feature of the present invention involves including in an information recording and reproducing apparatus a data optical disk drive for storing data, a work a backup optical disk drive for temporarily storing data, and an optical disk control unit for controlling recording and reproduction of data with the data optical disk drive and the work optical disk drive being coupled to the host device.

With this arrangement, the optical disk control unit records both data updating control commands and recording data, fed from the host device, into the work optical disk drive and, in addition, records the recorded data into the data optical disk drive in accordance with a drive control command. In response to a failure of the data optical disk drive, the optical disk control unit reproduces the control commands and the recorded data recorded in the work optical disk drive so as to restore the data of the data optical disk drive in accordance with the reproduced control commands. Thus, even when a problem occurs such as power abnormality or hardware error, it is possible to restore the data by using the control commands and data stored in the work optical disk drive, thereby preventing the data from being lost.

Another feature of the present invention involves forming an information recording and reproducing apparatus by including a disk cache memory for temporarily storing data from a host device, an optical disk control unit for controlling an optical disk drive and the disk cache memory, and a work optical disk drive for temporarily recording data.

With this arrangement, the optical disk control unit records the recorded data transmitted from the host device into the work optical disk drive once and, in addition, writes the data into the disk cache memory so as to record the data of the disk cache memory into the optical disk drive if required. This sharply decreases the number of recording accesses of the data optical disk drive.

According to the present invention, it is thus possible to sharply decrease the number of data writing accesses to the optical disk by using the disk cache memory and to prevent data loss upon power abnormality by always recording the written data into the work optical disk, thereby resulting in a significant practical effect.

In accordance with the present invention, there is provided an information recording and reproducing apparatus comprising a data optical disk drive for storing data, a work optical disk drive for temporarily storing the data, and an optical disk control unit for coupling the data optical disk drive and the work optical disk drive to a host device to control recording and reproduction of the data, the optical disk control unit writing data-updating control commands and recording data from the host device into the work optical disk drive and further writing the recording data into the data optical disk drive in accordance with the control commands. This, in response to occurrence of a problem associated with the data optical disk drive, such as a power failure or hardware error for example, the inventive structure is capable of reproducing the control commands and the recording data written in the work optical disk drive to restore the data in the data optical disk drive on the basis of the reproduced control commands.

Preferably, the apparatus further comprises a disk cache memory for temporarily storing the data, and the optical disk control unit further controls the disk cache memory so as to write the recording data transmitted from the host device into the work optical disk drive and, at the same time, to write the recording data into the disk cache memory so that the recording data from the disk cache memory is written into the data optical disk drive in accordance with write-back writing conditions.

In accordance with the present invention, there is further provided an information recording and reproducing apparatus comprising an optical disk drive for recording and reproducing data, a disk cache memory for temporarily storing the data, and an optical disk control unit for controlling recording and reproducing of the data into and from the optical disk drive and the disk cache memory, the optical disk drive including a data optical disk drive for storing the data and a work optical disk drive for temporarily storing the data, and the optical disk control unit writing data transmitted from a host device into the work or backup optical disk drive and further writing it into the disk cache memory and then writing the data of the disk cache memory into the optical disk drive in accordance with write-back writing conditions so as to decrease the number of recording accesses of the data optical disk drive.

BRIEF DESCRIPTION OF THE DRAWINGS

The foregoing object and features of the present invention will become more readily apparent from the following detailed description of the preferred embodiments taken in conjunction with the accompanying drawings in which.

DETAILED DESCRIPTION OF THE INVENTION

Figure 1:
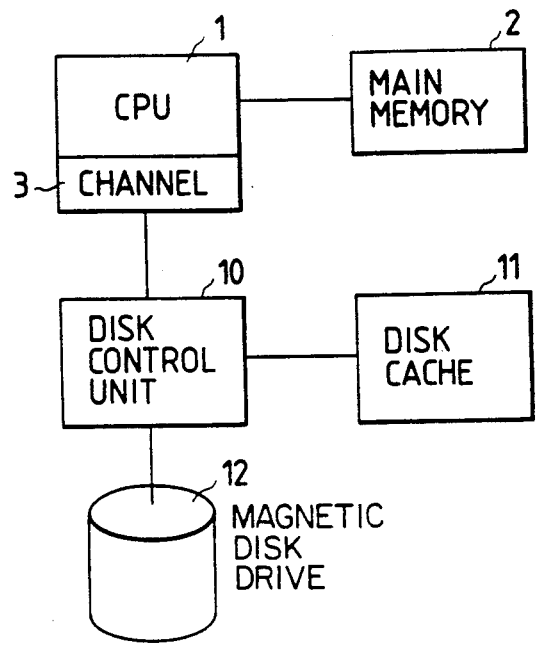
FIG. 1 is a block diagram showing an arrangement of a conventional information recording and reproducing apparatus.
Figure 2:
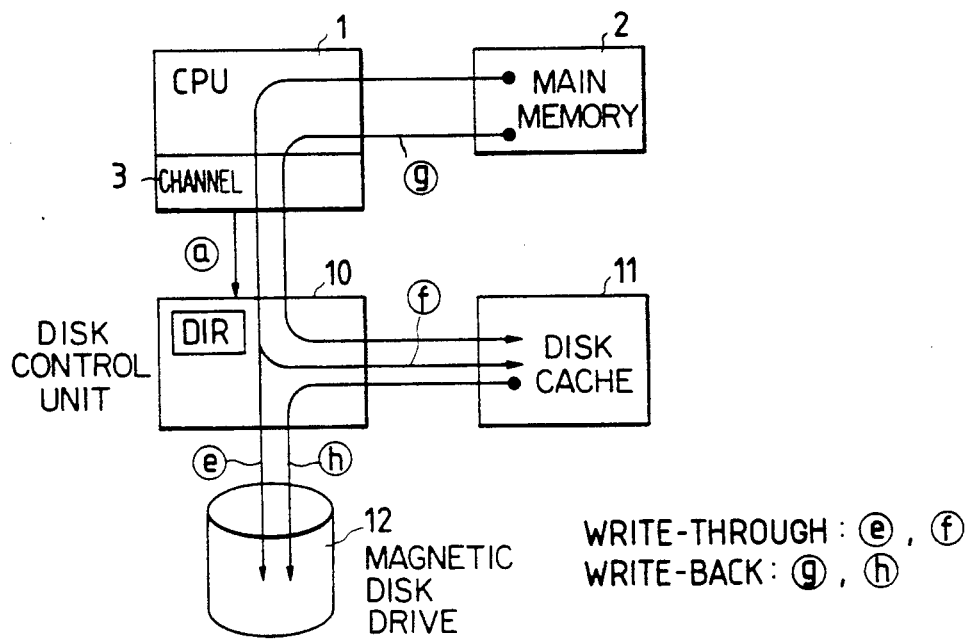
FIG. 2 is an illustration of flow of data in the FIG. 1 conventional information recording and reproducing apparatus.
Figure 3:
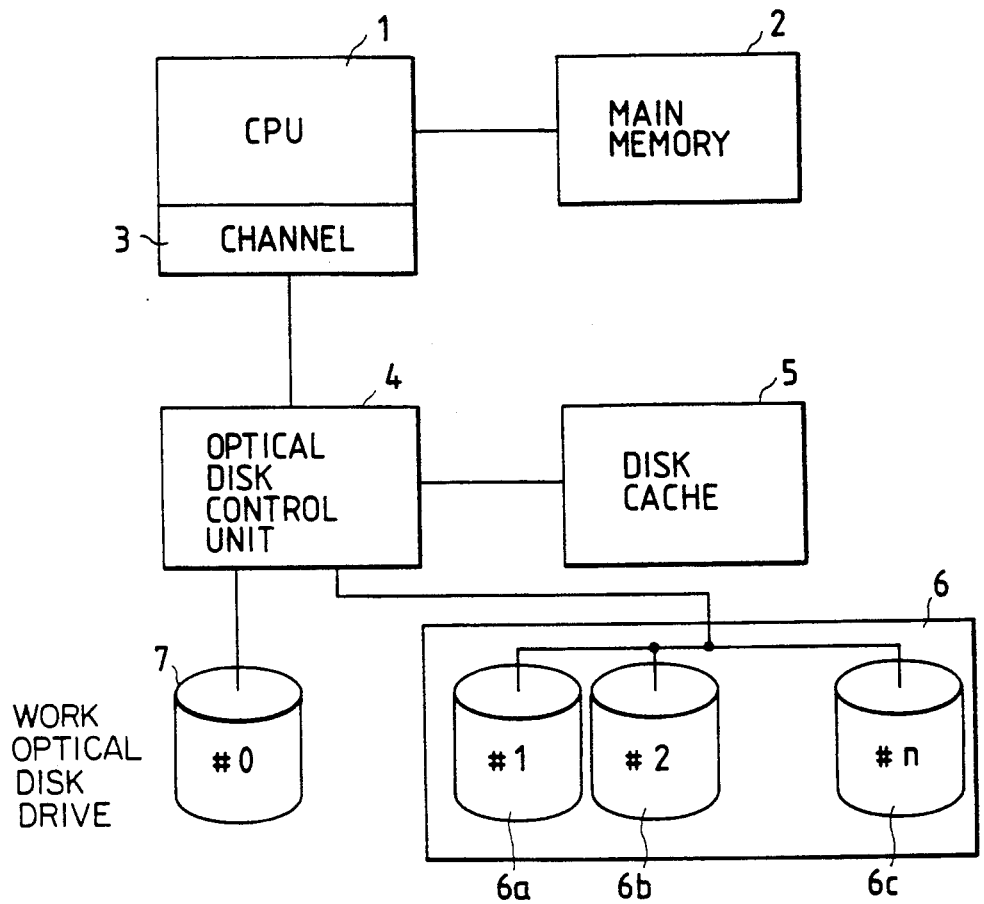
FIG. 3 is a block diagram showing an arrangement of an information recording and reproducing apparatus according to an embodiment of the present invention.

Referring now to FIG. 3, there is illustrated an information recording and reproducing apparatus according to an embodiment of the present invention, where parts corresponding to those in the conventional information recording and reproducing apparatus of FIGS. 1 and 2 will be marked with the same numerals. In FIG. 3, illustrated at numeral 1 is a CPU of a host computer which acts as a host device. The CPU 1 is coupled to a main memory 2 for storing data and programs. Numeral 3 is a channel for input and output control of data to and from the CPU 1. Also included in the information recording and reproducing apparatus is an optical disk control unit 4 which controls a data optical disk drive 6, a work or backup optical disk drive 7 and a disk cache memory 5 so as to effect speeding-up of data recording and reproduction. The disk cache memory 5 reads out and stores data in advance to effect speeding-up of data access by the CPU 1. The data optical disk drive 6 comprises a plurality of optical disk drives 6a, 6b and 6c so as to increase the storage capacity of the apparatus and the work optical disk drive 7 stores recording data from the CPU 1.

Figure 4:
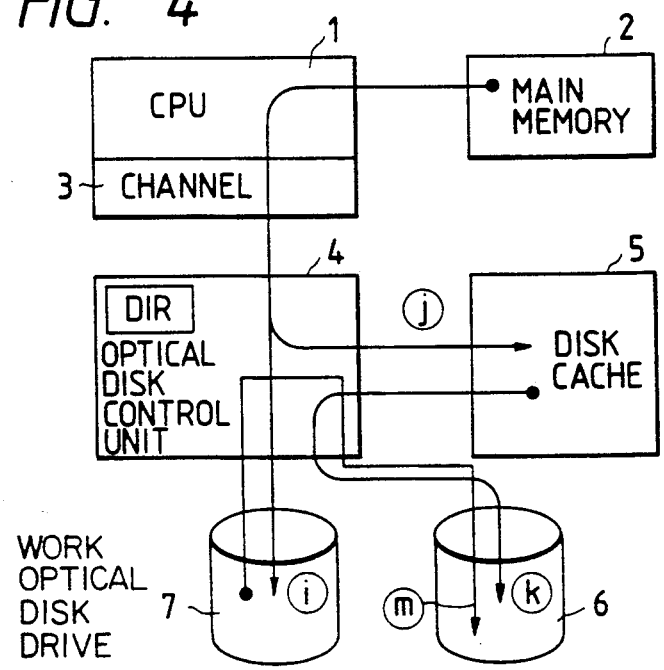
FIG. 4 is an illustration of flow of data in the information recording and reproducing apparatus of FIG. 3.

FIG. 4 is an illustration of the flow of data in a data-writing operation. In FIG. 4, characters ⓘ and ⓙ designate a flow of data to be recorded from the main storage 2 into the work optical disk drive 7 in accordance with the write-through system and a flow of the recording data to be written therefrom into the disk cache memory 5 in accordance with the same system. Further, a character ⓚ represents a flow of the data to be written from the disk cache memory 5 in the data optical disk drive 6 in accordance with the write-back system and a character ⓜ depicts a flow of data in data-restoring where the latest (most recent) data from the work optical disk drive 7 are restored with respect to the data optical disk drive 6 under control of the optical disk control unit 4.

A description will be given hereinbelow in terms of a data-writing operation of the information recording and reproducing apparatus of this embodiment. The CPU 1 issues a data-writing command to the optical disk control unit 4 so that data are transmitted from the main storage 2. The data transmitted therefrom through the channel 3 are recorded in the work optical disk drive 7 (ⓘ) and, at the same time, are recorded in the disk cache memory 5 in accordance with the write-through system (ⓙ). The recording data are recorded in the work optical disk drive 7 in the order of arrival of the data and command from the CPU 1 so as to take a sequential file structure.

The optical disk control unit 4 transmits the data of the disk cache memory 5 to the data optical disk drive 6 so that the data are written therein in one of the following write-back writing conditions: the data is not needed; an empty area is made in the disk cache memory 5 for storing other data; or, generally, the data replacement mechanism of the disk cache memory 5 determines that new data are entered into the disk cache memory 5 or that the contents of the disk cache memory 5 match the contents of the data optical disk drive 6.

That is, with the capacity of the disk cache memory 5 and the data replacement algorithm being appropriately selected, it is possible to sharply decrease the actual number of times of recording of data from the disk cache memory 5 to the data optical disk drive 6. For example, if a directory DIR whose rewriting frequency is maximized is always placed in the disk cache memory 5, the advantageous effect of the invention becomes extremely great. In case of detection of hardware errors of the optical disk drive 6, such as insufficient or excessive power output of the recording laser, track jumpover in recording, uncorrectable error of the read data, and diagnostic error, the operator should cut off the power of the apparatus for removal of the pertinent optical disk drive whereby the content of the disk cache memory 5 is lost. Furthermore, similarly, when the power failure suddenly occurs during recording of data or when the power source is cut off before the contents of the disk cache memory 5 match the contents of the data optical disk drive 6, the contents of the disk cache memory 5 are lost.

The optical disk control unit 4, upon activation of the apparatus, checks the contents of the data optical disk drive 6 on the basis of the contents of the data optical disk drive and work optical disk drive 7. If all of the commands recorded in the work optical disk drive 7 are normally processed with respect to the data optical disk drive 6, the optical disk control unit 4 indicates to the CPU 1 the completion of activation of the apparatus. When the command recorded in the work optical disk drive 7 is not processed with respect to the data optical disk drive 6, the optical disk control unit 4 reads out the commands and data recorded in the work optical disk drive 7 so as to compare them with the contents of the data optical disk drive 6 to search a non-processed file. Recording into the data optical disk drive 6 is performed by using the commands and data, corresponding to the non-processed file, read out from the work optical disk drive 7 whereby the data optical disk drive 6 can be restored so as to attain the most recent state.

The data-reading operation is the same as the conventional example and therefore the description will be omitted.

Figure 5:
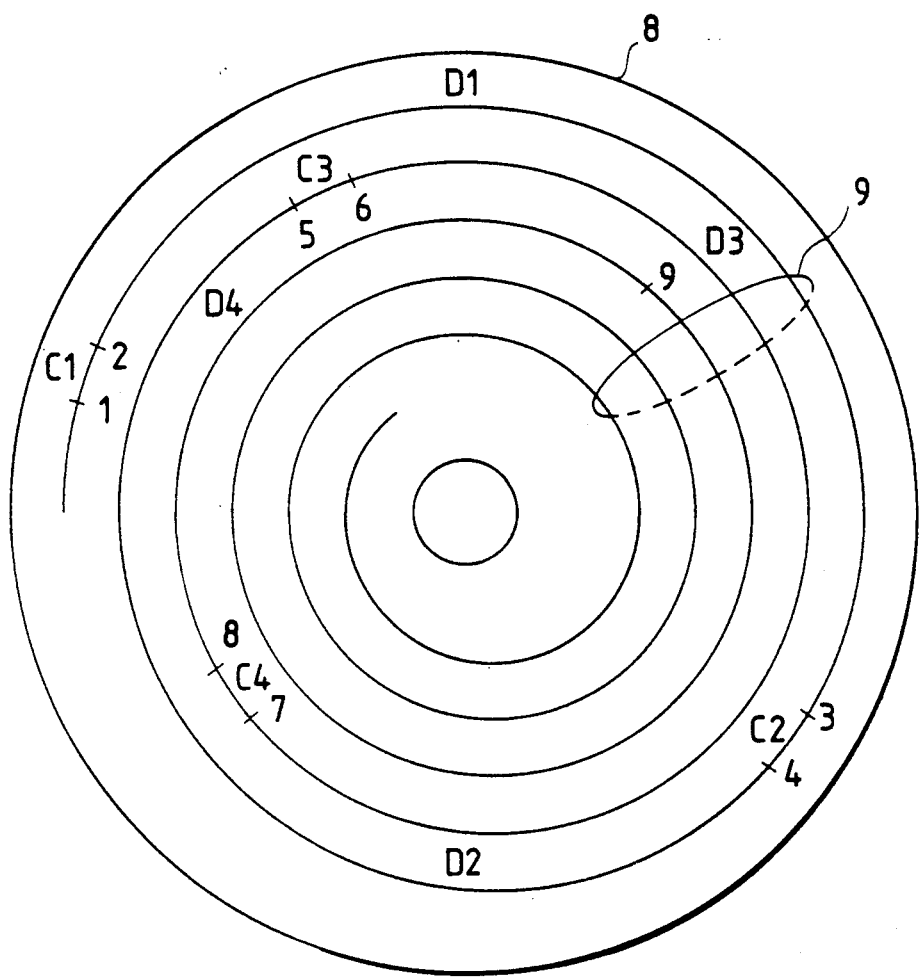
FIG. 5 shows one example of a data-recording locus on an optical disk of a work optical disk drive used in the FIG. 3 apparatus.

FIG. 5 shows a recorded locus of data recorded on an optical disk of the work optical disk drive 7. In FIG. 5, numeral 8 represents an optical disk and numeral 9 designates a track formed spirally. As illustrated in FIG. 5, the work optical disk drive 7 successively records commands and data from the CPU 1 as a sequential file in the increasing order of the track sector adresses. As the first data, a command C1 is written in an area (1-2) of a track 9 and a datum D1 is written in an area (2-3) thereof. Thereafter, as the second data, a command C2 is recorded in an area (3-4) and a datum D2 is recorded in an area (4-5). Further, as the third data, a command C3 is recorded in an area (5-6) and a datum D3 is recorded in an area (6-7). Still further, as the fourth data, a command C4 is written in an area (7-8) and a datum D4 is written in an area (8-9).

The data from the host CPU 1 ("host data") are recorded in both the work optical disk drive 7 and the disk cache memory 5. The data of the disk cache memory 5 are written in the data optical disk drive 6. Thus, in preparation for the next recording after recording of the data, the work optical disk drive 7 is arranged so as to make it unnecessary to effect retrieval of a target track for recording the next data, a step which requires an optical head of the work optical disk drive 7 to retrace the finally formed (or most recently accessed) track. That is, the optical head can access quickly to the target sector by merely waiting for rotation of a predetermined sector, because it is already placed on the target track. Moreover, control is performed so that for recording data the addressing is continuously effected from the final track sector of the optical disk 8 to the first track sector thereof. This always allows the backup of data corresponding to the recording capacity of the optical disk 8. Generally, this recording capacity is about several times 100 MB and therefore the backup capacity approaches infinity.

For example, when the recording capacity is 300 MB and the write cyclability is 100,000, the equivalent capacity becomes extremely large (e.g., 300 MB$\times$100,000=30$\times$10$^{12}$B (30 TB (Tera byte))) Accordingly, exceeding of the write cyclability occurs only when as much as 30 TB of the data are written. This is a data scale which is not attained by a general large-scale system during several years to several tens of years of operation. Thus, if the optical disk 8 is required to be exchanged by a new one after reaching the limit of the write cyclability thereof, the interval of exchange is in excess of several years, thereby resulting in practical elimination of a problem of excessive disk replacement.

Thus, if the track of the optical disk 8 is formed spirally, data can successively be written without waiting for rotation of the disk 8, and further with a sequential file being taken, the track access time with respect to the work optical disk drive 8 can be shortened so as to be only the rotation waiting time for the disk.

As described above, according to this embodiment, the recording data to the work optical disk drive 7 are written in accordance with the write-through system and the data-writing to the data optical disk drive 6 for actually storing the data is performed in accordance with the write-back system, thereby allowing prevention of data loss during power-off and further reduction of the number of times of writing to the optical disk.

In addition, since the work optical disk drive 7 sequentially records data in a spiral form, the data access time becomes only the waiting time of rotation of the optical disk. Moreover, since the data are recorded so as to form a spiral track, the data recording can be effected with respect to plural tracks without requiring waiting for a rotation as for a track made in concentric circles so that the speed performance of the invention becomes more than twice that of the magnetic disk. Here, with the improvement of the data access speed generally achieved by the disk cache memory, the general access time, 50 to 100 ms, of the optical disk drive can be improved up to the access time of the magnetic disk drive.

Although in the above description an optical disk drive is used as a disk drive, the invention is not limited to the optical disk and it is also appropriate to use a magnetic disk drive. In addition, the optical disk is not limited to one of the phase change rewriting type optical disks and it is also appropriate to use a magneto-optical disk. Furthermore, although in this embodiment the apparatus is equipped with the disk cache memory, even if the apparatus is arranged so as to be provided with only the work optical disk drive, data optical disk drive and optical disk control unit for controlling these drives but is not equipped with the disk cache memory, it is possible to restore the data of the data optical disk drive during occurrence of abnormality. It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. An information recording and reproducing apparatus comprising:
    a data optical disk drive for storing data,
    a work optical disk drive for temporarily storing data, and
    an optical disk control means for coupling said data optical disk drive and said work optical disk drive to a host device to control recording and reproduction of data,
    said optical disk control means for writing both control commands for the host device to update data and host data from said host device into said work optical disk drive and for writing said host data into said data optical disk drive in according with said control commands so as to reproduce both said control commands and said host data written in said work optical disk drive upon occurrence of a malfunction of said data optical disk drive and to restore said host data written in said data optical disk drive on the basis of the control commands reproduced from said work optical disk drive, and
    further comprising a disk cache memory for temporarily storing data;
    wherein said optical disk control means controls said disk cache memory to write said host data transmitted from said host device into said disk cache memory at the same time that said data-updating control commands and said host data are written from said host device into said work optical disk drive.

2. An information recording and reproducing apparatus as claimed in claim 1, wherein said host data and said control commands from said host device are written in said work optical disk drive in chronological order as a sequentially formed file.

3. An information recording and reproducing apparatus as claimed in claim 1, wherein said work optical disk drive records the data temporarily stored therein in a spiral track on an optical disk thereof.

4. An information recording and reproducing apparatus as claimed in claim 1, wherein said optical disk control means writes said host data into said work optical disk drive in order of arrival as a sequential file so as to decrease the number of recording accesses to said work optical disk drive.

5. An information recording and reproducing apparatus as claimed in claim 1, wherein said optical disk control means further controls said disk cache memory to write said host data from said disk cache memory into said data optical disk drive in accordance with a write-back operation.

6. An information recording and reproducing apparatus as claimed in claim 1, wherein an optical head of said work optical disk drive is moved, after recording/reproducing of data, to a track of the work optical disk drive most recently accessed during recording/reproducing of the data.

7. An information recording and reproducing apparatus as claimed in claim 1, wherein said optical disk control means writes said host data and control commands in said work optical disk drive by implementing a write-through operation.

8. An information recording and reproducing apparatus as claimed in claim 1, wherein said optical disk control means writes said host data and control commands in said work optical disk drive by implementing a write-through operation and writes said host data in said data optical disk drive by implementing a write-back operation.

9. An information recording and reproducing apparatus comprising:
    a plurality of data optical disk drives for recording and reproducing data,
    a work optical disk drive for temporarily storing data,
    a disk cache for temporarily storing data, and
    an optical disk control means coupling said data optical disk drives and said work optical disk drive to a host device for controlling recording and reproduction of data and for controlling said disk cache,
    said optical disk control means restoring data stored in one of said data optical disk drives upon occurrence of a malfunction of said one of said data optical disk drives,
    wherein said optical disk control means continuously and sequentially writes at least a write control command and host data from said host device onto tracks of said work optical disk drive;
    temporarily stores the host data in said disk cache;
    transfers the host data from said disk cache into said one of said data optical disk drives;
    reads the write control command and host data from said work optical disk drive;
    restores said one of said data optical disk drives by re-executing the write control command read from said work optical disk drive using the host data read from said work optical disk drive; and
    stores data resulting from re-execution of the write control command into said one of said data optical disk drives.

10. An information recording and reproducing apparatus as claimed in claim 9, wherein said work optical disk drive, operating at a time of completion of writing and reading of data to and from said work optical disk drive, keeps an optical head on a most recently accessed track of said work optical disk drive.

11. An information recording and reproducing apparatus as claimed in claim 9, wherein said optical disk control means implements a write-through operation when writing said host data and control commands in said work optical disk drive and implements a write-back operation for writing said host data into said one of said data optical disk drives.

12. An information recording and reproducing apparatus as claimed in claim 9, wherein said malfunction of said one of said data optical disk drives includes a power failure.

* * * * *